United States Patent [19]
Huff et al.

[11] Patent Number: 5,417,124
[45] Date of Patent: May 23, 1995

[54] GEAR CHANGE FOR AN INDUSTRIAL VEHICLE PROVIDED WITH AN INTEGRATED CONTROL UNIT

[75] Inventors: Martin Huff, Tettgang, Germany; Gian M. Pigozzi, Brescia; Armando Gregori, Breno, both of Italy

[73] Assignees: Iveco Fiat S.p.A., Turin, Italy; Zahnradfabrik Friedrichshafen AG, Friedrichshafen, Germany

[21] Appl. No.: 972,969

[22] Filed: Nov. 6, 1992

[30] Foreign Application Priority Data

Nov. 8, 1991 [IT] Italy .............................. TO91A0854

[51] Int. Cl.⁶ .............................. F16H 5/78; G05G 9/12
[52] U.S. Cl. .................................. 74/335; 74/473 R
[58] Field of Search ............... 74/473 R, 335, 336 R, 74/477; 192/3.58

[56] References Cited

U.S. PATENT DOCUMENTS

| | | |
|---|---|---|
| 3,772,933 | 11/1973 | Prenzel et al. .......................... 74/335 |
| 3,793,898 | 2/1974 | Espenschied et al. ................. 74/335 |
| 3,850,047 | 11/1974 | Davis ..................................... 74/473 P |
| 4,152,949 | 5/1979 | Vandervoort et al. ................. 74/331 |
| 4,445,393 | 1/1984 | Braun .............................. 74/473 R X |
| 4,788,889 | 12/1988 | Davis et al. ......................... 74/335 X |
| 4,896,553 | 1/1990 | Sato et al. ....................... 74/336 R X |
| 4,899,607 | 2/1990 | Stainton ......................... 74/473 R X |
| 5,042,327 | 8/1991 | Stainton ........................ 74/336 R X |
| 5,067,362 | 11/1991 | Holdenreid ................... 74/473 R X |
| 5,094,126 | 3/1992 | Stainton et al. .................. 74/335 X |

*Primary Examiner*—Dirk Wright
*Assistant Examiner*—Khoi Ta
*Attorney, Agent, or Firm*—Ladas & Parry

[57] ABSTRACT

A gear change for an industrial vehicle, provided with an integrated control unit housed in a seat of the gear box and comprising a plurality of actuators for controlling the selection and coupling of the gears, a plurality of electrovalves for the actuation of the actuators and a sensor of the angular speed of an input shaft of the gear change.

15 Claims, 3 Drawing Sheets

5,417,124

GEAR CHANGE FOR AN INDUSTRIAL VEHICLE PROVIDED WITH AN INTEGRATED CONTROL UNIT

BACKGROUND OF THE INVENTION

The present invention relates to a gear change, and in particular to a gear change for an industrial vehicle.

Gear changes are known in which the coupling of the various gears is carried out by sliding sleeves controlled by fluid actuators via respective rods and forks. The actuation of these actuators is generally obtained by supplying electrical signals to a group of electrovalves which generate drive signals for power valves adapted selectively to supply the chambers of the actuators with the operating fluid. The electrical actuation signals may be generated by an electronic unit in response to enabling signals received from manually actuated transducers, for instance associated with a gear lever of conventional type, and/or automatically following processing of signals representing the operating conditions of the vehicle.

Gear changes for industrial vehicles are also generally provided with several stages in cascade, for instance a divider or "splitter" stage with two ratios, a main stage with three or four ratios plus reverse and a rank reducer with two ratios. Each of these stages is controlled by a respective actuator or, in the case of the main stage, by two actuators with axes at right angles to one another so as to allow the selection of the gear to be coupled by rotation of the control rod and coupling of the gear by translation of this rod.

Known gear changes of the type outlined above have certain drawbacks.

In particular, the various control members (actuators, electrovalves, power valves) are generally disposed in different positions; for instance, the valves are generally separated from the actuators and the latter are secured to the exterior or the interior of the gear box on different portions thereof.

The assembly of the various members is therefore complex and costly; the electrical and hydraulic cables are complicated; subsequent action in the event of malfunction is problematic; the arrangement of the various portions must be studied case by case and makes it impossible to standardize the controls for different versions of the gear change or for different gear changes or to vary the degree of automation of the gear change after initial installation.

The actuators are generally offset with respect to the control rods and are connected to these rods by transmission members which subject these rods to bending stresses.

SUMMARY OF THE INVENTION

The object of the present invention is to provide a gear change for a vehicle, in particular an industrial vehicle, which is free from the above-mentioned drawbacks connected with known gear changes.

This object is achieved by the present invention which relates to a gear change comprising an external box, an input shaft, an output shaft, a plurality of pairs of gears which may be selectively coupled by sliding coupling members to provide an angular coupling between the input shaft and the output shaft according to a plurality of transmission ratios, fluid actuator means for the control of the sliding coupling members and valve means for the actuation of the actuator means, characterized in that it comprises an integrated control unit incorporating at least the actuator means and the valve means.

BRIEF DESCRIPTION OF THE DRAWINGS

A preferred embodiment of the invention is set out in the following description, purely by way of non-limiting example, with reference to the accompanying drawings, in which.

Figure 1:
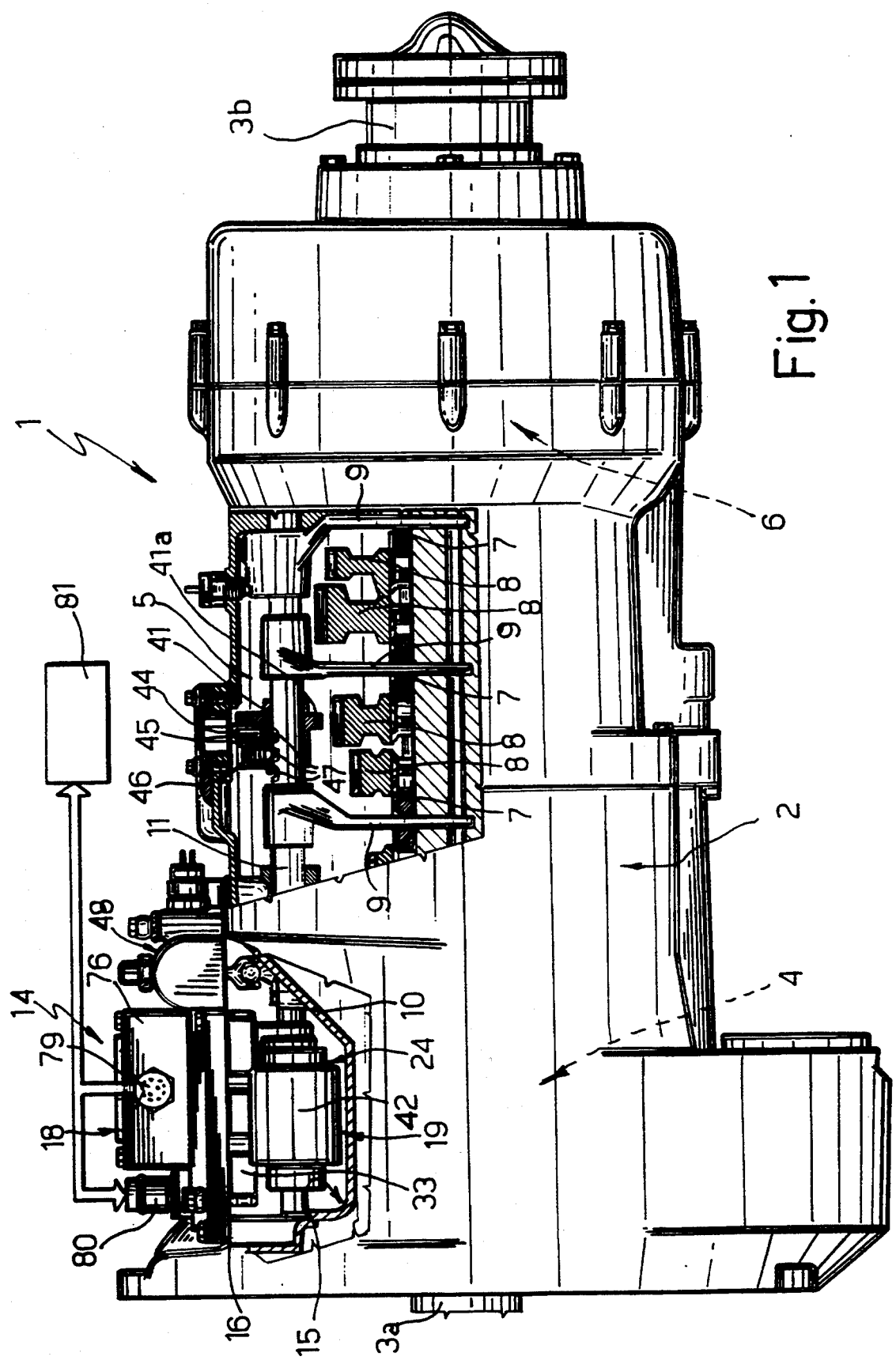
FIG. 1 is a side elevation view, partly broken away and in section of a gear change for an industrial vehicle in accordance with the present invention.

DETAILED DESCRIPTION OF THE INVENTION i n FIG. 1, a gear change for an industrial vehicle is shown overall by numeral 1.

The gear change 1 comprises an external box 2 housing three stages 4, 5, 6 in cascade adapted to define, in combination with one another, a plurality of transmission ratios between an input shaft 3a and an output shaft 3b of the gear change.

In particular, the gear change 1 comprises an input stage 4 with two transmission ratios, a main stage 5, part of which is shown in FIG. 1, which defines four forward drive ratios and one reverse ratio and an output stage 6 having two transmission ratios advantageously of epicyclic type.

The unit 4, not illustrated in detail as it is known, acts as a "splitter", i.e. as a duplicator of ratios adapted to define a pair of ratios adjacent to one another for each ratio defined by the successive stages; the unit 6, which is not illustrated in detail as it is known, acts as a rank reducer adapted to define two separate series of gears in combination with the preceding stages.

The coupling of the ratios in the three stages takes place via sliding sleeves 7 adapted to make respective toothed wheels 8 rigid with a transmission member of the gear change. The kinematic structure of the gear change is not shown as it may be of any known type and is not part of the present invention.

Figure 3:
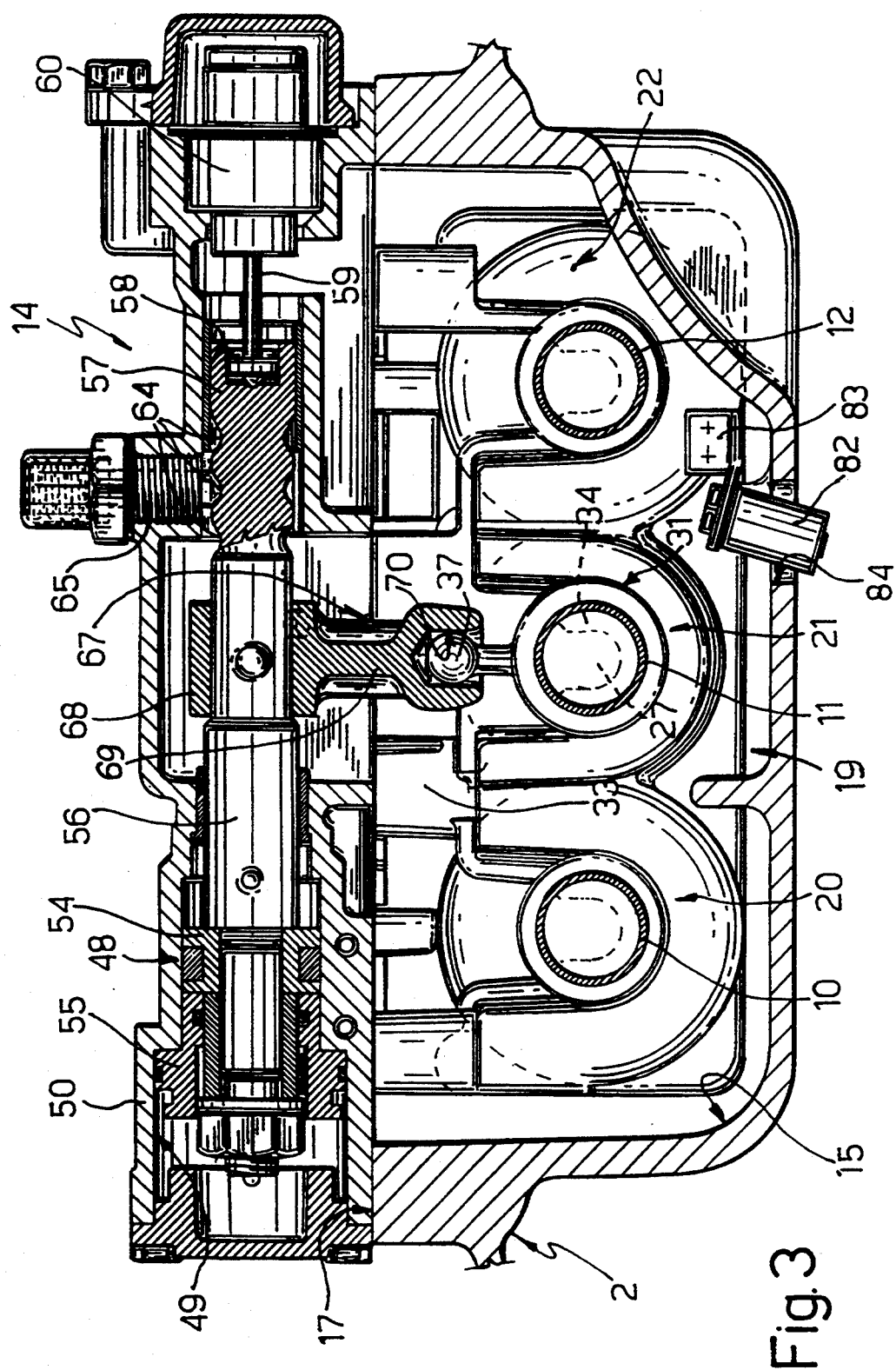
FIG. 3 is a cross-section taken along line III—III of FIG. 2.

The translation of the sleeves 7 for the coupling of the gear(s) corresponding thereto is controlled by respective forks 9 of conventional type which are in turn actuated by tubular rods 10, 11, 12 housed in the gear box and advantageously disposed alongside one another with their respective axes coplanar and parallel (FIG. 3).

The gear change 1 in particular comprises a first rod 10 for the selective coupling of the two ratios of the splitter 4, a second rod 11 for the selection and coupling of the gears of the main stage 5 and a third rod 12 for the selective coupling of the ratios of the rank reducer 6.

According to the present invention, the rods 10, 11, 12 are controlled by an integrated control unit 14 described in detail below.

Figure 2:
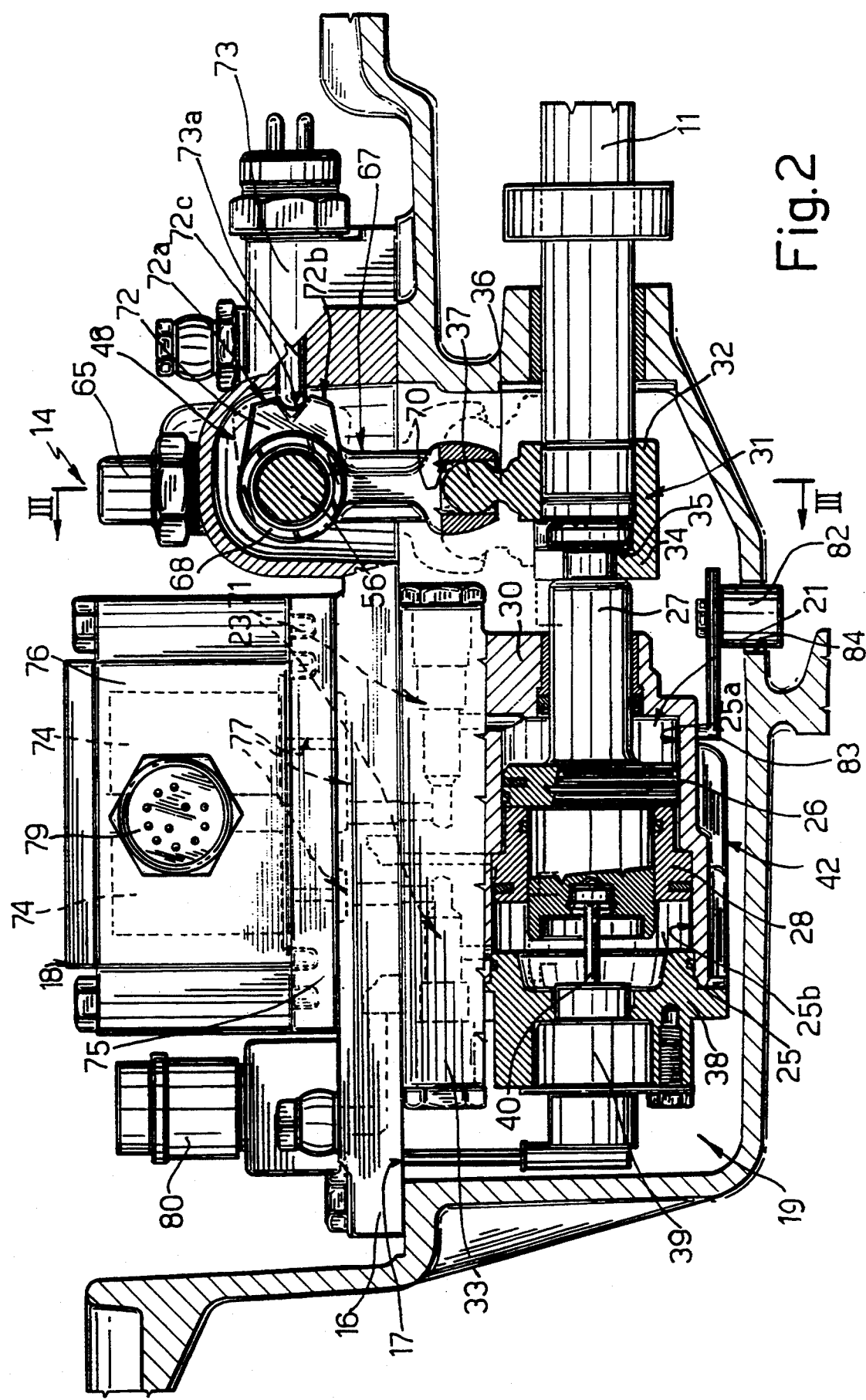
FIG. 2 is a side elevation view, partly broken away and in section and on an enlarged scale of an integrated control unit in the gear change of FIG. 1.

With reference to FIGS. 2 and 8, the control unit 14 is partly housed in an upper recess 15 of the gear box 2; this unit essentially comprises a support plate 16 fixed by screws to a peripheral edge 17 of the recess 15, an electropneumatic valve unit 18 secured to a surface of the plate 16 facing towards the exterior of the recess 15 and a fluid actuation unit 19 secured to a lower surface of the plate 16 and housed in the recess 15.

The actuation unit 19 (FIGS. 2, 3) essentially comprises three actuators 20, 21, 22 and relative emergency actuation valves 28 adapted to allow fluid actuation externally to the actuators in the event of malfunction. The unit 19 has an outer body 24 secured to the plate 16 by screws (not shown) formed by a cylinder block 42 in which the cylinders 25 of the actuators 20, 21, 22 are provided and by a valve block 33 forming the static or stationary portions of the emergency valves 23. The actuators 20, 21, 22 are adapted to control the rods 10, 11, 1 2 with which they are respectively coaxial.

FIG. 2 provides a detailed illustration of the actuator 21 which is of the three-position type with a double piston.

The actuator 21 in particular comprises a first piston 26 rigid with an actuation rod 27 and sliding in a leak-tight manner in a first portion 25a of the respective cylinder 25, and a second piston 28 mounted coaxially with respect to the first piston and sliding in a leak-tight manner in a second portion 25b of the cylinder 25 which has a greater diameter than the portion 25a. The pistons consequently define three chambers within the cylinder 25, whose selective connection to a pressurized fluid supply source makes it possible to obtain three different axial positions of the piston 26 in a known manner which is not therefore described in detail.

The rod 27, disposed to pass through a head 30 of the body 24, is connected to the respective rod 11 by a tubular connection member 31 provided with a cylindrical end 32 secured rigidly to the rod 11 by a transverse pin (not shown) and with an opposite end forming a U-shaped fork 34 which engages a peripheral groove 85 of the rod 27.

The connection member 31 has a radial projection 86 terminating in a spherical head 37 whose purpose is described below.

An opposite head 38 of the cylinder 25 formed by a closure cover of the body 24 houses a potentiometer 39 for detecting the axial stroke of the piston 26 with which a sensor member 40 of this potentiometer cooperates.

A selector member 41 (FIG. 1) is mounted in an angularly fixed and axially sliding manner on the rod 11 within the gear box and has a peripheral groove 44 engaged by an axial positioning member 45 rigid with the gear box. This selector member 41 houses a spherical resilient stop device 46 which is adapted selectively to cooperate with three grooves provided on the rod 11 in each of the respective axial positions defined by the actuator 21.

In proximity to the selector member 41, rod 11 has a radial projection, which is not shown as it is known, which is adapted selectively to cooperate, depending on the angular position of the rod I 1, with respective lugs of the forks 9 which are not shown as they are known. In this way one of the forks, mounted in an axially free manner on the rod 11, may be made axially rigid with the rod 11 in order to transmit the axial actuation forces of the actuator 21 to the respective sleeve 7.

Moreover, member 41 has a radial flange 41a designed to cooperate with the lugs of the other forks 9 in order to maintain them axially fixed during the axial motion of the rod 11.

The angular position of the rod 11 may be varied by a further pneumatic actuator 48, shown in FIG. B, having its axis at right angles to the axes of the actuators 20, 21, 22, of the three-position type with a double piston.

The actuator 48 is substantially similar to the actuator 21 and is not therefore described in detail for the sake of brevity.

The actuator 48 comprises a cylinder 49 provided in a tubular portion 50 rigid with the support plate 16; the respective pistons 54, 55 slide in the cylinder 49, one of these pistons 54 being axially rigid with a control rod 56. The rod 56 is supported radially at a free end 57 in a tubular seat 58 provided integrally in the plate 16 and cooperates via this end with a sensor member 59 of a potentiometer 60 for the detection of the stroke of this rod 56.

In the vicinity of this free end 57, the rod 56 has three annular grooves 64 with a rounded profile with which a spherical resilient stop device 65 is adapted selectively to cooperate in the respective operating positions of this rod.

A control member 67 is rigidly secured to an intermediate portion 66 of the rod 56; this control member is essentially formed by a cylindrical bushing 68 keyed on the rod 56 and by an arm 69 extending integrally and radially from the bushing 68 and having an end seat 70 engaged by the spherical head 37 of the connection member 31.

The actuator 48 may be actuated from outside via emergency valves 71 integrated in the above-mentioned valve block 33.

A projection 72 (FIG. 2) provided with an external profile formed by two lateral rectilinear sections 72a, 72b and an intermediate groove 72c also projects radially from the bushing 68. A sensor member 73a of a switch 73 cooperates with this profile in order to detect the intermediate angular position of the member 67 as will be explained below.

The actuators 20, 22 are fluid cylinders having two positions of conventional type and are not therefore illustrated in detail. These actuators are connected to the respective control rods 10, 12 in a conventional manner and are provided with respective potentiometers 39 (not shown) for the detection of the axial stroke.

The valve unit 18 comprises a plurality of electro-valves 74 controlling the actuators 20, 21, 22 and 48, for example of the three-way two-position type, which are mounted on a support base 75 fixed to the plate 17 and housed in a box 76 secured in turn to the base 75.

The base 75 and the support plate 17 are provided with a plurality of channels shown by 77 and illustrated in part in FIGS. 2 and 3 which are formed by surface grooves having appropriate paths, and blind or through holes and provide for all the connections of the electro-valves 74 and emergency valves 23, 71 with the actuators 20, 21, 22 and 48 as well as the connection of the above-mentioned valves with a pressurized fluid supply source and a discharge (not shown). The electrovalves 74 and the potentiometers 39 of the actuators 20, 21, 22 are connected electrically to respective multiple connectors 79, 80 which are adapted to be coupled in use to corresponding connectors (not shown) for connection to a microprocessor control unit 81.

The integrated control unit 14 lastly comprises a sensor 82 of the angular speed of the input shaft 3a of the gear change; this sensor is secured to the cylinder block 42 by a clamp 83 and is mounted in use through an appropriate hole 84 in the box 2 provided on the base of the recess The control unit 81 is adapted to control the unit 14 and is adapted to receive input signals from sensors of operating parameters associated with the gear change 1 (for instance from the potentiometers 39, 60, from the sensor 82, etc.) and to generate control signals for the electrovalves 74 in response to enabling signals generated by the manual actuation of a gear lever and/or automatically according to programmed logic.

The operation of the gear change 1 is known per se and is therefore described very briefly.

The gear selected by the operator and/or processed by the control unit 81 on the basis of the above-mentioned input signals is defined by the combination of the respective transmission ratios of the splitter 4, the main stage 5 and the rank reducer 6.

As regards the units 4 and 6, following the drive signals received from the control unit 81, the electrovalves 74 actuate the actuators 20 and 22 which bring the rods 10 and 12 into the positions corresponding to the transmission ratio selected.

As regards the main unit B, all the transmission ratios defined thereby are selected via the rod 11 and in particular via the combination of an appropriate angular position of this rod obtained via the actuator 48 and the subsequent axial displacement obtained via the actuator 21; it will be appreciated that both the actuator 48 and the actuator 21 are controlled by the respective electrovalves 74 in response to the drive signals generated by the control unit 81.

In particular, the axial displacement of the rod 56 of the actuator 48 and therefore of the control member 67 rigid therewith causes a rotation of the connection member 31 and therefore of the rod 11; this displacement is continuously detected by the potentiometer 60 which supplies corresponding signals to the control unit 81. Each of the three axial positions of the rod 56, which are made stable even in the absence of pneumatic actuators by the spherical stop device 65, corresponds to an angular position of the rod 11 in which the above-mentioned radial projection of the selector member 41 engages a respective fork 9.

The actuator 21 is shown in FIG. 2 in the intermediate axial position in which the main stage 5 of the gear change is in a neutral condition. This condition is detected by the switch 73 which is adapted to generate an enabling signal for the ignition of the vehicle engine.

The actuation of the actuator 21 in one of the two directions entails the axial displacement of the fork 9 selected and the coupling of the corresponding gear by means of the respective sleeve 7. The stroke of the piston 26 and therefore of the rod 11 is detected continuously by the potentiometer 39 which supplies a corresponding electrical signal to the control unit 81.

The three stable axial positions of the rod 11 are maintained by the stop device 46 even in the absence of pneumatic actuation forces.

The advantages obtained with the present invention are evident from an examination of the characteristic features of the gear change 1.

In the first place, all the control members of the gear change are merged in a single integrated unit.

This entails evident advantages in economic terms and from the point of view of speed of assembly, simplicity and speed of production of the electrical and fluid connections, ease of action in the event of malfunction and versatility; it is possible to use a control unit for different gear changes or to equip the same gear change with a different type of control unit.

The actuators 20, 21, 22 are also coaxial with the respective control rods 10, 11, 12 with the result that there are no bending stresses on these rods during their actuation.

Further advantages lie in the possibility of simplifying the design of the gear box which does not have to be provided with attachments for the various sensors and actuators, in the possibility of carrying out testing of the integrated unit prior to assembly on the gear box and lastly in the more accurate sensor measurements which are not subject to the manufacturing tolerances of the gear box and assembly tolerances in respect of the gear box.

It is evident that modifications and variants may be made to the gear change 1 provided that they do not depart from the scope of the present invention.

In particular, the unit 14 may also incorporate an electronic control circuit, for instance in the form of one or more cards; moreover, the emergency valves 23, 71 may be omitted from the unit 14.

We claim:

1. A gear change comprising an external box, an input shaft, an output shaft, a plurality of transmission stages in cascade in said box comprising a plurality of pairs of gears which are selectively engaged by sliding coupling members and defining a plurality of transmission ratios within each transmission stage and further defining, in combination with one another stages, an overall transmission ratio; between said input shaft and said output shaft, means for selecting gears to be engaged in at least one of said transmission stages in accordance with a selected transmission ratio between the input and output shafts, respective means for engaging and disengaging gears in each of said transmission stages, and an integrated control unit including at least first fluid actuator means for controlling said means for selecting gears in said one of said transmission stages, second fluid actuator means for controlling said respective means for engaging and disengaging gears in said one of said transmission stages, and valve means for actuating said first and second actuator means, wherein said sliding coupling members include control rods for respective transmission stages, said second actuator means comprising a respective fluid actuator for each transmission stage connected to a corresponding control rod of the respective transmission stage to shift said control rod and thereby engage the gears of the respective transmission stage in accordance with the selected transmission ratio, said first fluid actuator means being operative on said control rod of said at least one transmission stage to displace said control rod independently of said second actuator means for enabling the gears of said at least one transmission stage to be engaged when said control rod is shifted by the respective fluid actuator of the second actuator means, said control rod of said one transmission stage being longitudinally slidable along an axis by said second fluid actuator means to selectively engage and disengage the gears of said one transmission stage, said means for selecting gears in said at least one transmission stage being mounted on said control rod of said at least one transmission stage and undergoing displacement with said control rod in accordance with the displacement of said control rod by said first actuator means, to cause said control rod to engage the selected gear pair when the control rod undergoes longitudinal sliding by said second actuator means along said axis.

2. A gear change as claimed in claim 1, wherein the control unit is mounted in a respective seat of the box.

3. A gear change as claimed in claim 1, wherein said valve means comprises a plurality of electrovalves for the control of the first and second actuator means, said control unit comprising a support plate secured to the box on which at least the first and second actuator means and the electrovalves are mounted.

4. A gear change as claimed in claim 3, wherein said plate is provided with a plurality of internal surface channels for fluid connections of the first and second actuator means and the electrovalves.

5. A gear change as claimed in claim 4, wherein said control unit further comprises a plurality of emergency valves for fluid actuation externally of the first and second actuator means, said emergency valves being mounted on the support plate, said channels in the plate connecting the emergency valves to the first and second actuator means.

6. A gear change as claimed in claim 5, which further comprises a body secured to the support plate and integrally forming a cylinder block in which respective cylinders of the second actuator means are provided and a valve block forming at least stationary portions of the emergency valves.

7. A gear change as claimed in claim 1, wherein the second actuator means are coaxial with the respective control rods of the sliding coupling members.

8. A gear change as claimed in claim 7, wherein the first actuator means has an axis at right angles to the second actuator means and comprises a fluid actuator a movable rod of which is connected via a control member to the respective one of the control rods associated with the second actuator means of said one transmission stage, this said control member being connected to rotate the control rod responsive to an axial translation of said movable rod.

9. A gear change as claimed in claim 8, wherein the fluid actuator of the first actuator means comprises a cylinder provided integrally with the support plate.

10. A gear change as claimed in claim 1, wherein the control unit comprises a sensor of the angular speed of said input shaft.

11. A gear change as claimed in claim 1, comprising means coupling said first fluid actuator means to said control rod of said one transmission stage so that the displacement of said control rod is a rotation of said control rod between a plurality of angular positions corresponding to the gears to be engaged and disengaged in said one transmission stage according to the selected transmission ratio.

12. A gear change as claimed in claim 11, wherein the fluid actuators of the second actuator means are axially aligned with and coupled to the respective said control rods.

13. A gear change as claimed in claim 12, wherein said control rods of the plurality of stages are arranged in parallel adjacent relation to one another in said box.

14. A gear change as claimed in claim 13, comprising a support plate fixed to said box, said fluid actuators of the second fluid actuator means being secured to said plate within said box.

15. A gear change as claimed in claim 14, wherein said valve means and said first fluid actuator means are supported by said plate.

* * * * *